United States Patent
Jozinovic et al.

(10) Patent No.: US 9,759,422 B2
(45) Date of Patent: Sep. 12, 2017

(54) EVAPORATOR BURNER FOR A MOBILE HEATING DEVICE

(71) Applicant: WEBASTO SE, Stockdorf (DE)

(72) Inventors: Darko Jozinovic, Munich (DE); Bengt Meier, Eching (DE); Andreas Winter, Augsburg (DE); Vitali Dell, Munich (DE)

(73) Assignee: WEBASTO SE, Stockdorf (DE)

( * ) Notice: Subject to any disclaimer, the term of this patent is extended or adjusted under 35 U.S.C. 154(b) by 426 days.

(21) Appl. No.: 14/363,553

(22) PCT Filed: Nov. 20, 2012

(86) PCT No.: PCT/DE2012/100353
§ 371 (c)(1),
(2) Date: Jun. 6, 2014

(87) PCT Pub. No.: WO2013/104349
PCT Pub. Date: Jul. 18, 2013

(65) Prior Publication Data
US 2014/0346242 A1    Nov. 27, 2014

(30) Foreign Application Priority Data

Jan. 10, 2012   (DE) ........................ 10 2012 100 173

(51) Int. Cl.
*F23D 5/18*   (2006.01)
*F23C 7/04*   (2006.01)
(Continued)

(52) U.S. Cl.
CPC ............. *F23C 7/04* (2013.01); *B60H 1/2203* (2013.01); *F23C 7/004* (2013.01); *F23C 7/06* (2013.01);
(Continued)

(58) Field of Classification Search
CPC .......... B60H 1/2203; F23C 7/004; F23C 7/04; F23C 7/06; F23D 2900/05002; F23D 3/18; F23D 3/40; F23D 5/18
See application file for complete search history.

(56) References Cited

U.S. PATENT DOCUMENTS

| 3,144,862 A * | 8/1964 | Hottenroth | ........... B60H 1/2209 |
| | | | 126/110 R |
| 3,159,201 A * | 12/1964 | Hottenroth | ........... B60H 1/2203 |
| | | | 126/110 R |

(Continued)

FOREIGN PATENT DOCUMENTS

| DE | 3233321 A1 | 3/1984 |
| DE | 4225749 A1 | 2/1993 |

(Continued)

OTHER PUBLICATIONS

International Search Report.

*Primary Examiner* — Avinash Savani
*Assistant Examiner* — Deepak Deean
(74) *Attorney, Agent, or Firm* — Fitch, Even, Tabin & Flannery, LLP

(57) ABSTRACT

An evaporator burner for a mobile heating device is provided having a combustion chamber, an evaporator accommodation, and an evaporator element for evaporation of liquid fuel. The evaporator element is accommodated in the evaporator accommodation at the side facing the combustion chamber. At the side of the evaporator accommodation facing away from the combustion chamber, the evaporator burner comprises at least one combustion air guide element which is arranged such that a combustion air flow path extending at least along a portion of a base wall of the evaporator accommodation is formed between the combustion air guide element and the base wall of the evaporator accommodation.

9 Claims, 2 Drawing Sheets

Figure 1:
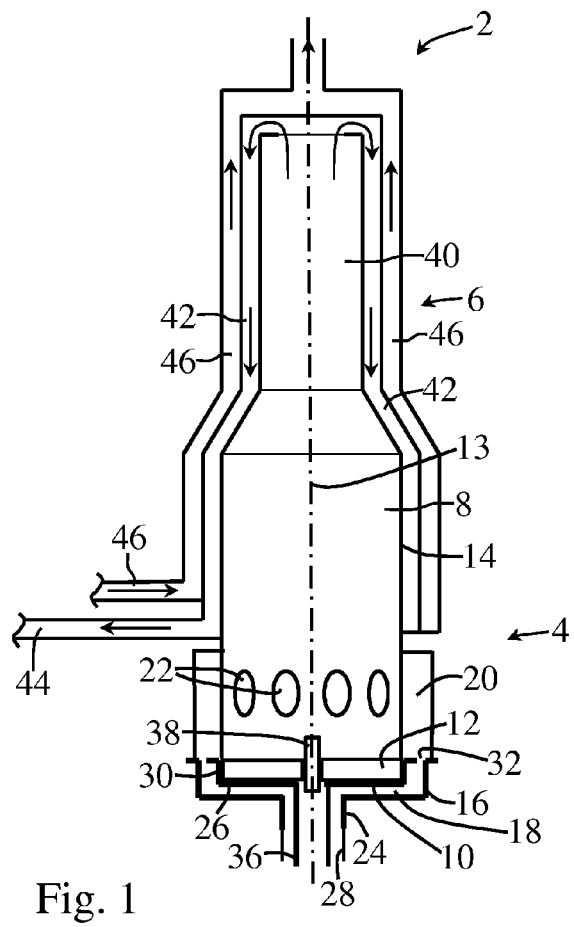

(51) Int. Cl.
  *F23C 7/00* (2006.01)
  *F23C 7/06* (2006.01)
  *F23D 3/40* (2006.01)
  *B60H 1/22* (2006.01)
  *F23D 3/18* (2006.01)
(52) U.S. Cl.
  CPC ............... *F23D 3/18* (2013.01); *F23D 3/40* (2013.01); *F23D 5/18* (2013.01); *F23D 2900/05002* (2013.01)

(56) References Cited

U.S. PATENT DOCUMENTS

| | | | | |
|---|---|---|---|---|
| 3,174,277 | A * | 3/1965 | Hettich | F01N 3/24 237/12.3 C |
| 3,220,460 | A * | 11/1965 | Goubsky | F23C 7/004 431/238 |
| 3,849,055 | A * | 11/1974 | Stanley | F23D 5/00 431/170 |
| 4,128,388 | A | 12/1978 | Freze | |
| 4,530,658 | A * | 7/1985 | Panick | F23D 3/40 126/116 R |
| 4,643,673 | A | 2/1987 | Bäckström | |
| 4,818,219 | A * | 4/1989 | Widemann | B60H 1/2203 126/116 R |
| 4,845,940 | A * | 7/1989 | Beer | F23C 6/045 60/732 |
| 4,923,033 | A * | 5/1990 | Panick | B60H 1/2212 126/116 R |
| 5,020,991 | A * | 6/1991 | Schaale | F23D 3/40 126/110 B |
| 5,137,445 | A * | 8/1992 | Chu | B60H 1/00414 126/110 B |
| 5,197,871 | A | 3/1993 | Yamamoto et al. | |
| 5,249,956 | A * | 10/1993 | Chu | B60H 1/00414 126/110 B |
| 5,605,453 | A | 2/1997 | Kenner et al. | |
| 6,213,406 | B1 * | 4/2001 | Kenzi | B60H 1/2203 126/110 C |
| 6,726,114 | B2 * | 4/2004 | Blaschke | B01B 1/005 237/2 R |
| 6,988,885 | B2 | 1/2006 | Blaschke et al. | |

FOREIGN PATENT DOCUMENTS

| | | |
|---|---|---|
| DE | 4243712 C1 | 6/1994 |
| DE | 4328790 A1 | 3/1995 |
| EP | 1918639 A2 | 5/2008 |
| JP | S53140639 A | 12/1978 |
| JP | H01314804 A | 12/1989 |
| JP | H0268408 A | 3/1990 |
| JP | S521540 A | 1/1997 |
| JP | 2003-021322 A | 1/2003 |
| RU | 48 619 U1 | 10/2005 |
| RU | 2 287 109 C2 | 11/2006 |
| RU | 82 294 U1 | 4/2009 |
| SU | 361 586 A3 | 12/1972 |
| WO | 9506224 A1 | 3/1995 |

* cited by examiner

EVAPORATOR BURNER FOR A MOBILE HEATING DEVICE

CROSS REFERENCE TO RELATED APPLICATIONS

This application is a U.S. National Stage Application filed under 35 U.S.C. §371 of International Application No. PCT/DE2012/100353, filed Nov. 20, 2012, designating the U.S., which claims benefit of the priority date of German Patent Application 10 2012 100173.1, filed Jan. 10, 2012, which are hereby incorporated herein by reference in their entirety.

The present invention relates to an evaporator burner for a mobile heating device according to the preamble of claim 1.

In mobile heating devices, in particular in parking heaters and/or supplementary heaters for vehicles, such as for example engine-powered land vehicles, evaporator burners are employed. Such evaporator burners comprise an evaporator element which is formed by a structure which can be flown through, interspersed with a multitude of pores in order to achieve good evaporation of liquid fuel. Further, evaporator burners comprise a combustion chamber for flaming combustion of (evaporated) fuel with combustion air. The combustion chamber is formed adjacent to the evaporator in the axial direction and is usually at least partially confined by a circumferential combustion chamber wall which is also called combustion pipe.

In operation, liquid fuel is supplied to the evaporator element. The capillary effect of the evaporator element ensures interpenetration of the latter with fuel. During starting of the heating device, the heat necessary for evaporating fuel is provided by a glow plug which is usually arranged at the side of the evaporator element facing the combustion chamber. After a starting period, the glow plug can then be switched off and the heat required for evaporation is provided by the (flaming) combustion process of fuel and combustion air in the combustion chamber.

It is an aim in mobile heating devices that these cover a wide range of heating power, such as e.g. from 1 kW to 5 kW (kW: kilowatt), and are operable over the whole covered range of heating power with good combustion characteristics. In particular in mobile heating devices having an evaporator burner, there is an inclination to deteriorated combustion characteristics when these are operated in the lower region of the respective covered range of heating power. In particular with fuel having a comparatively high boiling temperature (such as e.g. diesel), there is an inclination to formation of deposits at the evaporator element. In the case of fuel having a comparatively low boiling temperature (such as benzine, ethanol, etc.), there is an inclination that the combustion process runs in a pulsating manner, which inter alia causes disturbing sounds.

From DE 32 33 321 A1 an evaporator burner is known in which the evaporator accommodation (or support body) is supported in the combustion chamber such that heat removal by heat conduction from it is avoided.

Correspondingly, it is an object of the present invention to provide an evaporator burner for a mobile heating device with simple construction which is operable over a wide range of heating powers with continuously good combustion characteristics.

The object is solved by an evaporator burner according to claim 1. Advantageous further developments of the invention are defined in the dependent claims.

According to the present invention, an evaporator burner for a mobile heating device is provided which comprises a combustion chamber, an evaporator accommodation, and (at least) one evaporator element for evaporation of liquid fuel. The evaporator element is accommodated in the evaporator accommodation at the side (of the evaporator accommodation) facing the combustion chamber. At the side of the evaporator accommodation facing away from the combustion chamber, the evaporator burner comprises at least one combustion air guide element which is arranged such that a combustion air flow path extending at least along a portion of a base wall of the evaporator accommodation is formed between the combustion air guide element and the base wall of the evaporator accommodation.

It was found that the above described disadvantageous side-effects of operation with low heating power can be avoided if the evaporator accommodation (and thus also the evaporator element) is cooled. In particular in the case of low heating power (in relation to the available range of heating powers), due to the lower evaporation rate of fuel also the absorbed evaporation heat and thus the cooling of the evaporator accommodation and of the evaporator element is reduced. In principle, there are different possibilities to act against excessive heating-up of the evaporator accommodation and of the evaporator element. Such possibilities could in particular reside in the selection of the material and of the wall thickness in the region of the evaporator accommodation, or in other modifications to the construction of the evaporator burner. It is however difficult to find a solution which is simple from the constructional point of view and by which, on the one hand, at low heating power the above described disadvantageous side-effects can be avoided and by which, on the other hand, the starting ability of the evaporator burner at cold ambient temperatures and the combustion characteristics are not deteriorated.

The combustion air guide element which is provided according to the invention is a component of simple construction which is robust in use and cost-efficient in production. It can be employed in different evaporator burners. By guiding combustion air which is supplied to the combustion chamber between the combustion air guide element and the evaporator accommodation at least along a portion of the base wall of the evaporator accommodation, the evaporator accommodation is convectively cooled. The narrower the slit between the evaporator accommodation and the combustion air guide element is formed, the higher is the flow velocity of the combustion air (at the same supplied amount of combustion air) which effects stronger cooling. Furthermore, the cooling effect can also be influenced by the size of the combustion air inlet into the combustion air guide element. By the design of the evaporator burner according to the invention, good combustion characteristics can be achieved over the whole range of heating power. Excessive heat accumulation in the region of the evaporator accommodation and of the evaporator element, which heat accumulation tends to particularly arise at low heating power, is effectively avoided by the evaporator burner according to the invention. In the case of fuel having a comparatively high boiling temperature (such as e.g. diesel), formation of deposits at the evaporator element can thus be avoided which in turn leads to a longer life time of the evaporator burner. In the case of fuel having a comparatively low boiling temperature (such as e.g. benzine, ethanol, etc.), pulsation of the combustion can be avoided. This is due to the fact that pulsation of the combustion arises in particular from supplied fuel being evaporated and ignited to fast, whereby subsequently a break period occurs before ingnitable mixture is again formed in the region of the evaporator element. By the design of the evaporator burner according to the invention such an overly fast evaporation of supplied fuel is avoided and thus provision of a separate pulsation damper can be dispensed with. This results in cost savings.

In the present context, "mobile heating device" means a heating device which is designed for operation in mobile applications and correspondingly adapted. This means in particular that it can be transported (for instance fixedly mounted in a vehicle or only placed therein for transport, as the case may be) and is not only designed for permanent stationary use, such as would be the case in heating of a building. The mobile heating device can be fixedly installed in a vehicle (land vehicle, boat, etc.), in particular in a land vehicle. In particular, it is designed for heating a vehicle interior, such as of a land vehicle, boat or aircraft, or a partly open room, as can be for instance found on boats, in particular on yachts. The mobile heating device can also temporarily be used in a stationary manner, such as e.g. in big tents, containers (e.g. containers for construction sites), etc. According to an advantageous further development, the mobile heating device is designed as a parking heater (operable both with the vehicle engine running or at rest) or as a supplementary heater (operable only when the vehicle engine is running) for a land vehicle, such as e.g. a mobile home, a caravan, a bus, a passenger car, etc.

As is known in this technical field, several different possible realizations for the evaporator element exist, such as e.g. a realization from metal fibers, metal foam, porous ceramics, metal network, etc. It is substantial that the evaporator element comprises a comparatively large surface (compared to its volume) for effective evaporation of fuel. The evaporator accommodation comprises a base wall. Preferably, the latter is formed cup-shaped and correspondingly comprises a circumferential wall adjoining the base wall which is formed angled (in a right angle or in an obtuse angle) relative to the base wall. In particular, the evaporator element rests against the base wall of the evaporator accommodation. In this case, effective back-side cooling of the evaporator element is achieved by the design of the evaporator burner according to the invention. Also with regard to the combustion air guide element, there are different possible realizations as long as it is formed such that it guides at least a proportion of the combustion air which is supplied to the combustion chamber along the combustion air flow path formed between the combustion air guide element and the evaporator accommodation over at least a portion of the base wall of the evaporator accommodation. As the combustion air flow path extends along a portion of the base wall of the evaporator accommodation, this means that in operation the flow velocity of the supplied combustion air runs substantially parallel to the base wall. The combustion air guide element is in particular formed by a continuous component. Correspondingly, also the evaporator accommodation is preferably formed as a continuous component in the region of the combustion air flow path. The combustion air guide element and/or the evaporator accommodation can however also comprise discontinuities, holes, clearances, etc. as long as the guiding of combustion air described above is realized at least for a proportion of the supplied combustion air. The combustion chamber is in particular designed for flaming combustion of fuel and combustion air in its interior.

As far as "at least one" component is referred to in the present description, additionally to only one such component this encompasses also the possibility of several such components. This understanding is also valid in the further description even if this is not explicitly mentioned in every instance. Further, by the designation that "a" component is provided, the possibility of the provision of several such components, as the case may be, is not excluded, except where this option is excluded by the designation "exactly one", and as long as this option is technically reasonable.

According to a further development, the combustion air guide element extends cup-like (or cap-like) over the evaporator accommodation. In this manner, a combustion air flow path is provided over the whole back-side of the evaporator accommodation such that effective cooling effect can be achieved in operation. The combustion air guide element does not have to extend completely continuously over the evaporator accommodation. Rather, it can for instance comprise: a combustion air inlet for supply of combustion air into the combustion air flow path, a fuel supply pipe for supply of fuel to the evaporator element and/or a glow plug for ignition of the fuel-combustion air-mixture during a starting period of the evaporator burner. In particular, the combustion air guide element—similar to the evaporator accommodation —comprises a base wall and a circumferential wall adjoining the base wall, which circumferential wall is formed angled (in a right angle or in an obtuse angle) relative to the base wall.

According to a further development, the combustion air guide element—substantially centrally (in particular exactly centrally) above the base wall of the evaporator accommodation—comprises a combustion air inlet for supply of combustion air into the combustion air flow path. In this manner, uniform cooling of the evaporator accommodation (as well as of the evaporator element) is achieved. Supply of combustion air into the combustion air inlet can—depending on the design of the evaporator burner—be effected via a combustion air supply pipe or via a pre-chamber formed upstream of the combustion air inlet.

According to a further development, a contour of the combustion air guide element at the side facing the evaporator accommodation is formed corresponding to a contour of the evaporator accommodation at the side facing the combustion air guide element such that a slit, through which the combustion air flow path leads, is formed between the evaporator accommodation and the combustion air guide element. In this manner, uniform cooling is achieved over the whole backside of the evaporator accommodation and thus over the whole area of extension of the evaporator element. The slit formed between evaporator accommodation and combustion air guide element can be formed continuously (over the area of extension of the backside of the evaporator accommodation). Alternatively, support elements, by which a desired spacing between the combustion air guide element and the evaporator accommodation is ensured, and/or flow guiding elements for influencing on the flow direction of the combustion air can be provided in the slit between the evaporator accommodation and the combustion air guide element. In particular, the contours of the combustion air guide element and of the evaporator accommodation are formed cup-shaped such that a cup-shaped slit is formed therebetween.

According to a further development, the combustion air guide element and the evaporator accommodation are formed such that the combustion air flow path extends from a combustion air inlet, which is provided substantially centrally above the base wall of the evaporator accommodation, at least partly radially outward along the base wall, wherein the combustion air flow path leads into a ring-shaped combustion air pre-chamber which is formed ring-shaped around the combustion chamber. In this manner, uniform cooling of the evaporator accommodation is achieved. The radial direction extends perpendicular to the axial direction. The latter (i.e. the axial direction) is defined by the sequence of the evaporator accommodation and the combustion chamber, as explained above. In the case of a rotationally symmetric design of the evaporator accommodation and/or of the evaporator element and/or of the combustion chamber, the axial direction is also defined by the axis of rotational symmetry. The radial direction is further in particular defined by the ring shape of the combustion air pre-chamber. Usually, also the evaporator accommodation and the evaporator element are formed circular such that a radial direction is also determined in the same manner by these. However, an exactly circular shape of the combustion air pre-chamber, of the evaporator accommodation and of the evaporator element is not mandatory. The evaporator accommodation is in particular cup-shaped formed and, adjoining the base wall, comprises a circumferential wall angled in a right angle or in an obtuse angle relative to the base wall. In this case, the combustion air flow path after the base wall also extends along the angled circumferential wall of the evaporator accommodation, before it reaches the ring-shaped combustion air pre-chamber. The combustion air inlet is in particular formed in the combustion air guide element.

According to a further development, the combustion air pre-chamber is separated from the combustion chamber by a combustion chamber wall, which is formed circumferentially around the combustion chamber, and the combustion chamber wall comprises combustion air through-openings for supply of combustion air from the combustion air pre-chamber into the combustion chamber. In particular, the combustion air through-openings are uniformly formed in the circumferential direction in the combustion chamber wall.

According to a further development, the evaporator burner comprises flow guide elements in the combustion air flow path in the region between evaporator accommodation and combustion air guide element in such a manner that in operation a flow component in the circumferential direction is impressed onto the flowing combustion air by these. This flow component in the circumferential direction is at least partially maintained after the entry into the combustion chamber which results in turbulences in the interior of the combustion chamber and thus effects good mixing of fuel and combustion air. In doing so, complete conversion of fuel and combustion air is supported. The flow guide elements serve to influence the flow direction and can be formed in different kind and manner, as is known in this technical field. In particular, the flow guide elements can comprise spiral-shaped extending wings or rips which extend at least over a part or completely across the slit formed between evaporator accommodation and combustion air guide element. The flow guide elements can further be formed as a separate insert component which is inserted between evaporator accommodation and combustion air guide element. They can however also be fixedly connected (in form of e.g. rips or wings) to the evaporator accommodation and/or to the combustion air guide element.

According to a further development, the flow guide elements extend between the evaporator accommodation and the combustion air guide element over the region of the base wall of the evaporator accommodation. Accordingly, in this further development a flow component in the circumferential direction is impressed on the flowing combustion air already during passing of the base wall of the evaporator accommodation. Alternatively or additionally the flow guide elements extend over the region of a circumferential wall of the evaporator accommodation. Accordingly, in this further development a flow component in the circumferential direction is impressed onto the flowing combustion air during passing of the circumferential wall of the evaporator accommodation. Alternatively or additionally the evaporator burner comprises flow guide elements in the region of the ring-shaped combustion air pre-chamber in such a manner that in operation a flow component in the circumferential direction is impressed onto the flowing combustion air by these. In the latter case, the flow guide elements are particularly arranged at the inlet side of the combustion air pre-chamber. Generally it has to be noted that the flow guide elements can be provided in only one of the explained portions. They can however also extend over several or all portions such that the flow direction is continuously influenced over the whole flow path.

According to a further development, the combustion air supply is formed such that in operation of the combustion chamber all combustion air is supplied via the combustion air flow path, which is formed between the combustion air guide element and the evaporator accommodation, and subsequently via a ring-shaped combustion air pre-chamber, which is formed ring-shaped around the combustion chamber. In particular in such a combustion air supply, the design of the evaporator burner according to the invention is particularly advantageous since it effects particularly effective cooling of the evaporator accommodation and of the evaporator element. The present invention is however also applicable to another design of the combustion air supply. For example, also a proportion of the combustion air can be passed through the evaporator element via openings distributed in the base wall of the evaporator accommodation, which supports effective evaporation of liquid fuel. Additionally or alternatively a proportion of the combustion air can also be supplied into the combustion chamber via a socket which is formed centrally in the evaporator accommodation and which protrudes into the combustion chamber as compared to the evaporator element.

According to a further development, the combustion air guide element comprises a combustion air inlet which leads into the combustion air flow path formed between the evaporator accommodation and the combustion air guide element, wherein a fuel supply pipe for supplying (liquid) fuel to the evaporator element is accommodated in the combustion air inlet. By this design, also the fuel is cooled in the region in which it is supplied from the fuel supply pipe into the evaporator element. In this manner, too early evaporation of the fuel immediately during exit from the fuel supply pipe and thus too early ignition of it are avoided. This is in particular advantageous in the case of fuel having a comparatively low boiling temperature (e.g. benzine, ethanol, etc.) since pulsation of the combustion can be effectively avoided in this manner. Also in this realization the combustion air inlet is preferably arranged centrally above the base wall of the evaporator accommodation. The combustion air inlet is in particular formed as a socket which extends over a portion of the fuel supply pipe, whereby an even more effective cooling of the fuel in the inlet region is effected.

The present invention further relates to a mobile heating device, in particular vehicle heating device, comprising an evaporator burner according to the invention which can also be formed according to one or more of the explained further developments and/or variants. In the mobile heating device, the advantages explained above are achieved in corresponding manner.

Further advantages and developments of the invention will become apparent from the following description of embodiments with reference to the enclosed drawings.

Figure 2:
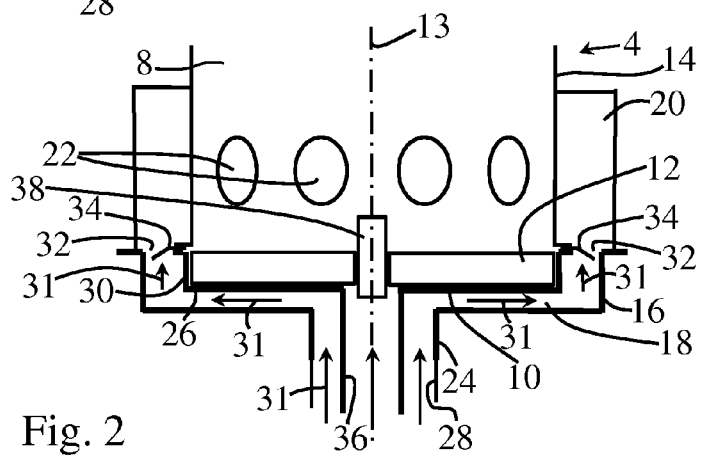
Figure 3:
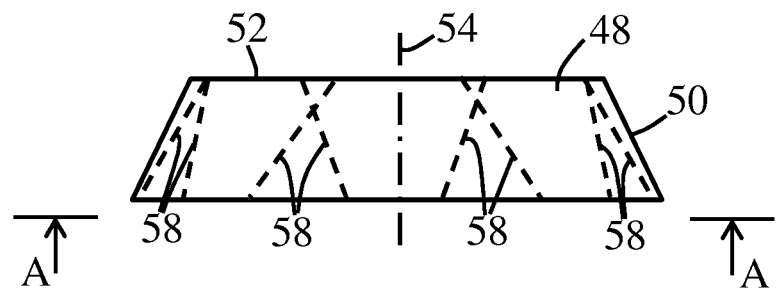
Figure 4:
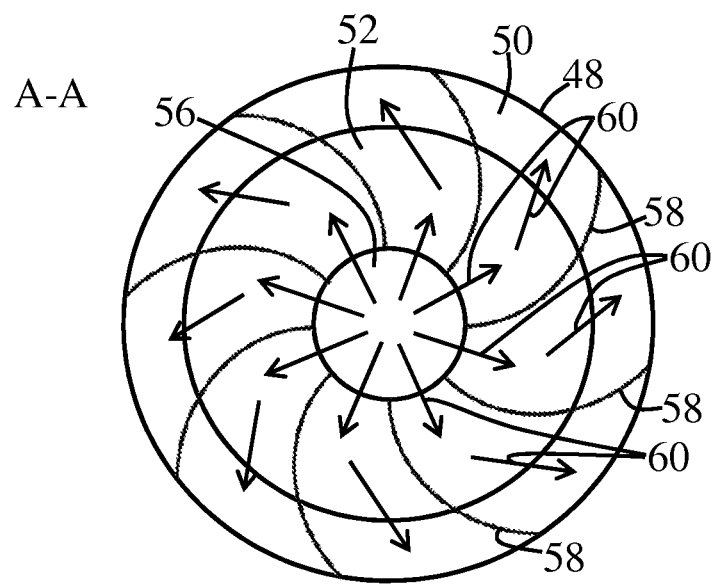

In the figures:

FIG. 1: shows a schematic illustration of a mobile heating device according to a first embodiment of the present invention in a sectional view;

FIG. 2: shows an enlarged illustration of the evaporator burner of FIG. 1;

FIG. 3: shows a side view of a combustion air guide element according to an alternative embodiment of the present invention; and FIG. 4: shows a view from below along the plane A-A of the combustion air guide element depicted in FIG. 3.

In FIG. 1, a mobile fuel-operated heating device 2 which forms a parking heater for a land vehicle is schematically illustrated. In the following, reference is made in particular to those components which stand in a certain relation to the present invention. The heating device 2 comprises an evaporator burner 4 and a heat exchanger 6. The evaporator burner 4 comprises, below others, a combustion chamber 8, an evaporator accommodation 10 and an evaporator element 12 for evaporation of liquid fuel. The combustion chamber 8, the evaporator accommodation 10 and the evaporator element 12 are substantially circularly formed and comprise a common axis of rotational symmetry 13.

In the circumferential direction, the combustion chamber 8 is delimited by a circumferential combustion chamber wall 14. At the face side in the region of the fuel supply, the combustion chamber 8 is delimited by the evaporator accommodation 10. The evaporator element 12 is accommodated in the evaporator accommodation 10 at the side facing the combustion chamber 8. At the side of the evaporator accommodation 10 facing away from the combustion chamber 8, the evaporator burner 4 further comprises a combustion air guide element 16. The combustion air guide element 16 is cup-shaped formed and is put over the evaporator accommodation 10 like a cap. Both the combustion air guide element 16 and the evaporator accommodation 10 are formed by a metal sheet which has received the desired shape in particular by deep-drawing. A contour of the combustion air guide element 16 substantially corresponds to the contour of the evaporator accommodation 10 such that a slit 18 is formed between the evaporator accommodation 10 and the combustion air guide element 16. A combustion air pre-chamber 20 is formed ring-shaped around the combustion chamber 8. The slit 18 opens into the combustion air pre-chamber 20. A fluid connection from the combustion air pre-chamber 20 to the combustion chamber 8 is established via combustion air through-openings 22 which are formed in the combustion chamber wall 14.

A more detailed explanation of the combustion air supply to the combustion chamber 8 will be given in the following with reference to FIG. 2. The combustion air supply is effected via a combustion air inlet 24 formed in the combustion air guide element 16, which combustion air inlet 24 is arranged centrally above a base wall 26 of the evaporator accommodation 10 and thus substantially on the axis of rotational symmetry 13. The combustion air inlet 24 is formed as a protruding socket. In particular, a combustion air supply pipe 28 may be connected to the combustion air inlet 24, as schematically depicted in FIGS. 1 and 2. The combustion air supplied in the combustion air inlet 24 is firstly fed in the axial direction (i.e. parallel to the axis of rotational symmetry 13) towards the evaporator accommodation 10. Upon arrival at the evaporator accommodation 10, the flowing combustion air is deflected and fed along the base wall 26 of the evaporator accommodation 10 in the plane outwards in the radial direction. The slit 18 between the base wall 26 of the evaporator accommodation 10 and the combustion air guide element 16 continuously extends over the whole area of the base wall 26 (except the region of the combustion air inlet 24) so that the base wall 26 is cooled substantially over its whole area (except a central region). Upon arrival at the outer end of the base wall 26, the flowing combustion air is again deflected and flows in the axial direction (i.e. parallel to the axis of rotational symmetry 13) along a circumferential wall 30 of the evaporator accommodation 10 into the combustion air pre-chamber 20. The flow direction of the combustion air in the region from the combustion air inlet 24 up to the combustion air pre-chamber 20 is illustrated by arrows 31 in FIG. 2. In the presently illustrated embodiment, all the combustion air supplied to the combustion chamber 8 is supplied via the combustion air flow path explained above (i.e. via the combustion air inlet 24, the slit 18, the combustion air pre-chamber 20 and the combustion air through-openings 22).

In the region of a (ring-shaped) inlet 32, which leads from the slit 18 into the combustion air pre-chamber 20, flow guide elements 34 are provided in the combustion air pre-chamber 20. These flow guide elements 34 are formed by a plurality of wings which are arranged in the circumferential direction along the ring-shaped inlet 32 and which protrude into the flow path. The flow guide elements 34 are oriented such that they impress a flow component in the circumferential direction onto the flowing combustion air during operation. Correspondingly, the combustion air flows in the combustion air pre-chamber 20 also partly in the circumferential direction which flow component is also maintained after entry into the combustion chamber 8 through the combustion air through-openings 22, whereby good mixing of the combustion air with fuel is achieved.

A fuel supply pipe 36 for supply of liquid fuel to the evaporator element 12 is accommodated in the socket-shaped combustion air inlet 24. The fuel supply pipe 36 opens in a central portion of the evaporator element 12. The centrally supplied liquid fuel is distributed over the area of the evaporator element 12 by the capillary effect and is evaporated from there. Due to arrangement of the fuel supply pipe 36 inside the socket-shaped combustion air inlet 24, combustion air flows around it during operation and it is cooled thereby. In doing so, it is prevented that the fuel is evaporated too early and ignited directly upon entry into the evaporator element 12, which would result in pulsation of combustion as explained above. A glow plug 38 (only schematically depicted in FIGS. 1 and 2), which is inter alia used during starting of the evaporator burner 4 for igniting the fuel-combustion air-mixture, is centrally provided in the evaporator element 12. After a starting period of the mobile heating device, the glow plug 38 is used as a flame guard in the present embodiment.

In the following, operation of the mobile heating device 2 (or of the evaporator burner 4) is explained with reference to FIG. 1. During operation, liquid fuel is supplied to the evaporator element 12 and evaporated from the latter, as explained above. Further, as explained above, combustion air is supplied to the combustion chamber 8 and mixed with the gaseous fuel. The fuel and the combustion air are converted in the combustion chamber 8 in a flaming combustion which sets heat free. The gases originating from the combustion (exhaust gases) then flow out from the combustion chamber 8 via a flame pipe 40 into the heat exchanger 6.

A first flow path 42 for the exhaust gases is formed in the heat exchanger 6. The exhaust gases flow inside the heat exchanger 6 along the first flow path 42 to an exhaust gas outlet 44 via which the exhaust gases are guided to the exterior. Further, a second flow path 46 is provided inside the heat exchanger 6, in which second flow path 46 coolant of the motor vehicle is guided. The first flow path 42 and the second flow path 46 are arranged such that heat is effectively transferred from the exhaust gases to the coolant during operation. In the present embodiment, the flow direction of the exhaust gases and the flow direction of the coolant in the heat exchanger 6 are oriented in opposite directions relative to each other, as schematically illustrated by the arrows in FIG. 1. The heated coolant is guided via a further heat exchanger (coolant-to-air heat exchanger) for heating of air which is supplied to the vehicle interior. Further, the engine of the motor vehicle is pre-heated by the coolant.

In the following, an alternative embodiment of a combustion air guide element 48 is explained with reference to FIGS. 3 and 4. The combustion air guide element 48 is illustrated in a side view in FIG. 3, while it is illustrated from below along the plane A-A (cf. FIG. 3) in FIG. 4. In the following explanation, substantially the differences as compared to the above explained first embodiment will be addressed. In the combustion air guide element 48, the circumferential wall 50 is angled relative to the base wall 52 in an obtuse angle. The combustion air guide element 48 is circularly formed and comprises centrally (i.e. around an axis of rotational symmetry 54) a combustion air inlet 56. In the present embodiment the combustion air inlet 56 is formed by an opening. The combustion air guide element 48 comprises integrally formed flow guide elements 58. The flow guide elements 58 run spirally-shaped and extend over both the base wall 52 and the circumferential wall 50 of the combustion air guide element 48. The flow guide elements 58 are formed by protruding rips which in the assembled state extend up to the corresponding evaporator accommodation (not shown). In FIG. 3, the course of the flow guide elements 58 (arranged inside) is depicted in dashed lines. In FIG. 4, the course of the flow guide elements 58 is depicted in continuous spirally-shaped lines. Further, the flow direction of combustion air supplied during operation is illustrated by arrows 60 in FIG. 4. The combustion air supplied through the combustion air inlet 56 first flows radially outward. Also, a flow component in the circumferential direction is impressed onto the flowing combustion air by the flow guide elements 58. This flow component running in the circumferential direction is at least partly maintained inside the combustion air pre-chamber and after passing through the combustion air through-openings inside the combustion chamber such that good mixing of combustion air with fuel is achieved.

The present invention is not restricted to the embodiments illustrated in the figures. In particular, different to FIG. 1 the combustion air pre-chamber may extend over a larger axial portion of the combustion chamber. It may also extend below the region of the heat exchanger, as the case may be. Further, plural rows of combustion air through-openings may be provided in the combustion chamber wall. Furthermore, a proportion of the combustion air can be provided to the combustion chamber via openings formed in the base wall of the evaporator accommodation. Also, the illustrated central position of the glow plug is not mandatory. Rather, the evaporator element can for example also be continuously formed and the glow plug may laterally protrude into the combustion chamber.

The invention claimed is:

1. An evaporator burner for a mobile heating device, comprising
a combustion chamber, an evaporator accommodation, and an evaporator element for evaporation of liquid fuel,
wherein the evaporator element is accommodated in the evaporator accommodation at a side facing the combustion chamber,
wherein at a side of the evaporator accommodation facing away from the combustion chamber, the evaporator burner comprises at least one combustion air guide element which is arranged such that a combustion air flow path extending at least along a portion of a base wall of the evaporator accommodation is formed between the combustion air guide element and the base wall of the evaporator accommodation,
wherein the combustion air guide element and the evaporator accommodation are formed such that the combustion air flow path extends from a combustion air inlet, which is provided centrally above the base wall of the evaporator accommodation, at least partly radially outward along the base wall, wherein the combustion air flow path leads into a ring-shaped combustion air pre-chamber which is formed ring-shaped around the combustion chamber,
wherein the evaporator burner comprises flow guide elements in the combustion air flow path in the region between evaporator accommodation and combustion air guide element in such a manner that in operation a flow component in the circumferential direction is impressed onto the flowing combustion air, and
wherein the flow guide elements extend up to the evaporator accommodation across a slit formed between the evaporator accommodation and the combustion air guide element over the region of the base wall of the evaporator accommodation.

2. The evaporator burner according to claim 1, wherein the combustion air guide element extends cup-like over the evaporator accommodation.

3. The evaporator burner according to claim 1, wherein the combustion air guide element comprises, centrally above the base wall of the evaporator accommodation, a combustion air inlet for supply of combustion air into the combustion air flow path.

4. The evaporator burner according to claim 1, wherein a contour of the combustion air guide element at the side facing the evaporator accommodation is formed corresponding to a contour of the evaporator accommodation at the side facing the combustion air guide element such that a slit, through which the combustion air flow path leads, is formed between the evaporator accommodation and the combustion air guide element.

5. The evaporator burner according to claim 1, wherein the combustion air pre-chamber is separated from the combustion chamber by a combustion chamber wall which is formed circumferentially around the combustion chamber and in that the combustion chamber wall comprises combustion air through-openings for supply of combustion air from the combustion air pre-chamber into the combustion chamber.

6. The evaporator burner according to claim 1, wherein the evaporator burner comprises flow guide elements in the region of the ring-shaped combustion air pre-chamber in such a manner that in operation a flow component in the circumferential direction is impressed onto the flowing combustion air.

7. The evaporator burner according to claim 1, being adapted such that in operation of the combustion chamber all combustion air is supplied via the combustion air flow path, which is formed between the combustion air guide element and the evaporator accommodation, and subsequently via a ring-shaped combustion air pre-chamber, which is formed ring-shaped around the combustion chamber.

8. The evaporator burner according to claim 1, wherein the combustion air guide element comprises a combustion air inlet which leads into the combustion air flow path formed between evaporator accommodation and combustion air guide element, wherein a fuel supply pipe for supplying fuel to the evaporator element is accommodated in the combustion air inlet.

9. A vehicle heating device, comprising
an evaporator burner having combustion chamber, an evaporator accommodation, and an evaporator element for evaporation of liquid fuel,
wherein the evaporator element is accommodated in the evaporator accommodation at a side facing the combustion chamber,
wherein at a side of the evaporator accommodation facing away from the combustion chamber, the evaporator burner comprises at least one combustion air guide element which is arranged such that a combustion air flow path extending at least along a portion of a base wall of the evaporator accommodation is formed between the combustion air guide element and the base wall of the evaporator accommodation,
wherein the combustion air guide element and the evaporator accommodation are formed such that the combustion air flow path extends from a combustion air inlet, which is provided centrally above the base wall of the evaporator accommodation, at least partly radially outward along the base wall, wherein the combustion air flow path leads into a ring-shaped combustion air pre-chamber which is formed ring-shaped around the combustion chamber,
wherein the evaporator burner comprises flow guide elements in the combustion air flow path in the region between evaporator accommodation and combustion air guide element in such a manner that in operation a flow component in the circumferential direction is impressed onto the flowing combustion air, and
wherein the flow guide elements extend up to the evaporator accommodation across a slit formed between the evaporator accommodation and the combustion air guide element over the region of the base wall of the evaporator accommodation.

\* \* \* \* \*